United States Patent
Yoshioka et al.

(10) Patent No.: US 12,538,289 B2
(45) Date of Patent: Jan. 27, 2026

(54) TERMINAL AND COMMUNICATION METHOD

(71) Applicant: NTT DOCOMO, INC., Tokyo (JP)

(72) Inventors: Shohei Yoshioka, Tokyo (JP); Satoshi Nagata, Tokyo (JP); Yanru Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 374 days.

(21) Appl. No.: 17/634,146

(22) PCT Filed: Aug. 15, 2019

(86) PCT No.: PCT/JP2019/032082
§ 371 (c)(1),
(2) Date: Feb. 9, 2022

(87) PCT Pub. No.: WO2021/029081
PCT Pub. Date: Feb. 18, 2021

(65) Prior Publication Data
US 2022/0322365 A1    Oct. 6, 2022

(51) Int. Cl.
*H04W 4/00* (2018.01)
*H04W 72/12* (2023.01)

(52) U.S. Cl.
CPC .................... *H04W 72/12* (2013.01)

(58) Field of Classification Search
CPC ..... H04W 72/04; H04W 72/12; H04W 72/40; H04W 4/46; H04W 72/20; H04L 1/08; H04L 1/1887; H04L 1/189
See application file for complete search history.

(56) References Cited

U.S. PATENT DOCUMENTS

| | | | |
|---|---|---|---|
| 2020/0045674 A1* | 2/2020 | Tseng | H04W 76/14 |
| 2020/0120674 A1* | 4/2020 | Lee | H04W 72/0453 |
| 2022/0303985 A1* | 9/2022 | Miao | H04W 72/0446 |

FOREIGN PATENT DOCUMENTS

WO    2019064465 A1    4/2019

OTHER PUBLICATIONS

3GPP TSG RAN WG1 #96bis; R1-1904256 "Discussion on NR V2X mode 2 resource allocation" Sony; Xi'an, China; Apr. 8-12, 2019 (7 pages).
3GPP TSG RAN WG1 #97; R1-1907130 "Mode 2 resource allocation schemes on sidelink" Reno, Nevada, US; May 13-17, 2019 (9 pages).
3GPP TS 36.213 V15.2.0 "3rd Generation Partnership Project; Technical Specification Group Radio Access Network; Evolved Universal Terrestrial Radio Access (E-UTRA); Physical layer procedures (Release 15)" Jun. 2018 (541 pages).

(Continued)

*Primary Examiner* — Shantell L Heiber
(74) *Attorney, Agent, or Firm* — Osha Bergman Watanabe & Burton LLP

(57) ABSTRACT

A terminal includes a transmitter that transmits a second signal specifying a resource for an initial transmission of a first signal on a sidelink; and a controller that selects, reserves, or pre-reserves a resource for the initial transmission of the first signal on the sidelink and at least one of one or more resources for one or more retransmissions of the first signal on the sidelink.

2 Claims, 16 Drawing Sheets

(56) References Cited

OTHER PUBLICATIONS

International Search Report issued in International Application No. PCT/JP2019/032082, mailed Feb. 25, 2020 (5 pages).
Written Opinion issued in International Application No. PCT/JP2019/032082; Dated Feb. 25, 2020 (4 pages).
Extended European Search Report issued in counterpart European Application No. 19941733.8 mailed on Mar. 21, 2023 (8 pages).
NEC; "Mode 2 resource allocation mechanism for NR sidelink"; 3GPP TSG RAN WG1 #97, R1-1906392; Reno, USA; May 13-17, 2019 (4 pages).

* cited by examiner

TERMINAL AND COMMUNICATION METHOD

TECHNICAL FIELD

The present invention relates to a terminal and a communication method in a radio communication system.

BACKGROUND ART

For Long Term Evolution (LTE) and a LTE successor system (e.g., LTE-Advanced (LTE-A), New Radio (NR) (which is also referred to as 5G)), sidelink (which is also referred to as Device to Device (D2D)) technology has been studied in which terminals, such as User Equipment (UE), directly communicate with each other without going through a base station.

In addition, implementation of Vehicle to Everything (V2X) has been studied and technical specifications have been developed. Here, V2X is a part of Intelligent Transport Systems (ITS) and, as illustrated in FIG. 1, V2X is a generic term for Vehicle to Vehicle (V2V), which implies a communication mode executed between vehicles; Vehicle to Infrastructure (V2I), which implies a communication mode executed between a vehicle and a rode-side unit (RSU: Road-Side Unit); Vehicle to Nomadic device (V2N), which implies a communication mode executed between a vehicle and a driver's mobile terminal; and a Vehicle to Pedestrian (V2P), which implies a communication mode executed between a vehicle and a pedestrian's mobile terminal.

RELATED ART DOCUMENT

Non-Patent Document

Non-Patent Document 1: 3GPP TS 36.213 V15.2.0(2018-06)

SUMMARY OF THE INVENTION

Problem to be Solved by the Invention

In SL transmission mode 2 of NR V2X, it is assumed that a resource reservation is to be supported at least for a sidelink transmission resource for blind retransmission of a transport block (TB) (retransmission such as repetition, other than a retransmission based on feedback information as in the case of HARQ). In addition, in SL transmission mode 2, a resource reservation by using signaling for a retransmission, based on a feedback, of a transport block on a Physical Sidelink Shared Channel (PSSCH), where the signaling is associated with a transmission of the transport block prior to the retransmission of the transport block, is assumed to be supported.

There is a need for a method of specifying, in a case in which a retransmission of a transport block (TB) is to be performed, a resource used for the retransmission.

Means for Solving the Problem

According to an aspect of the present invention, there is provided a terminal including a transmitter that transmits a second signal specifying a resource for an initial transmission of a first signal on a sidelink; and a controller that selects, reserves, or pre-reserves a resource for the initial transmission of the first signal on the sidelink and at least one of one or more resources for one or more retransmissions of the first signal on the sidelink.

Advantage of the Invention

According to an embodiment, a method can be provided that specifies, in a case in which a transport block (TB) is to be retransmitted, a resource used for the retransmission.

BRIEF DESCRIPTION OF DRAWINGS

FIG. 2B is a diagram illustrating an outline of SL transmission mode 2a.

EMBODIMENTS OF THE INVENTION

In the following, embodiments of the present invention (the embodiments) are described with reference to the drawings. The embodiments described below are merely examples, and the embodiments to which the present invention is applied are not limited to the following embodiments.

A method of inter-terminal direct communication according to the embodiments is assumed to be LTE or NR sidelink (SL (Sidelink)), but the method of inter-terminal direct communication is not limited to this method. Additionally, the name "sidelink" is an example and Uplink (UL) may include a function of SL without using the name "sidelink." SL may be distinguished from Downlink (DL) or UL by a difference in frequency or time resource and SL may have another name.

UL and SL may also be distinguished by a difference in one or more combinations of time resources, frequency resources, time and frequency resources, reference signals referenced to determine a Pathloss in transmission power control, and reference signals used to synchronize (PSS/SSS/PSSS/SSSSS).

For example, for UL, a reference signal of an antenna port X_ANT is used as a reference signal to be referenced to determine a Pathloss in transmission power control, and for SL (including UL used as SL), a reference signal of antenna port Y_ANT is used as a reference signal to be referenced to determine a Pathloss in transmission power control.

In the embodiments, it is mainly assumed that a terminal (which may be referred to as user equipment (UE)) is installed in a vehicle, but embodiments of the present invention are not limited to the embodiments. For example, a terminal may be a terminal carried by a person, a terminal may be a device installed in a drone or an aircraft, or a terminal may be a base station, an RSU, a relay station (relay node), a user equipment having a scheduling capability, or the like.

(System Configuration)

Figure 1:
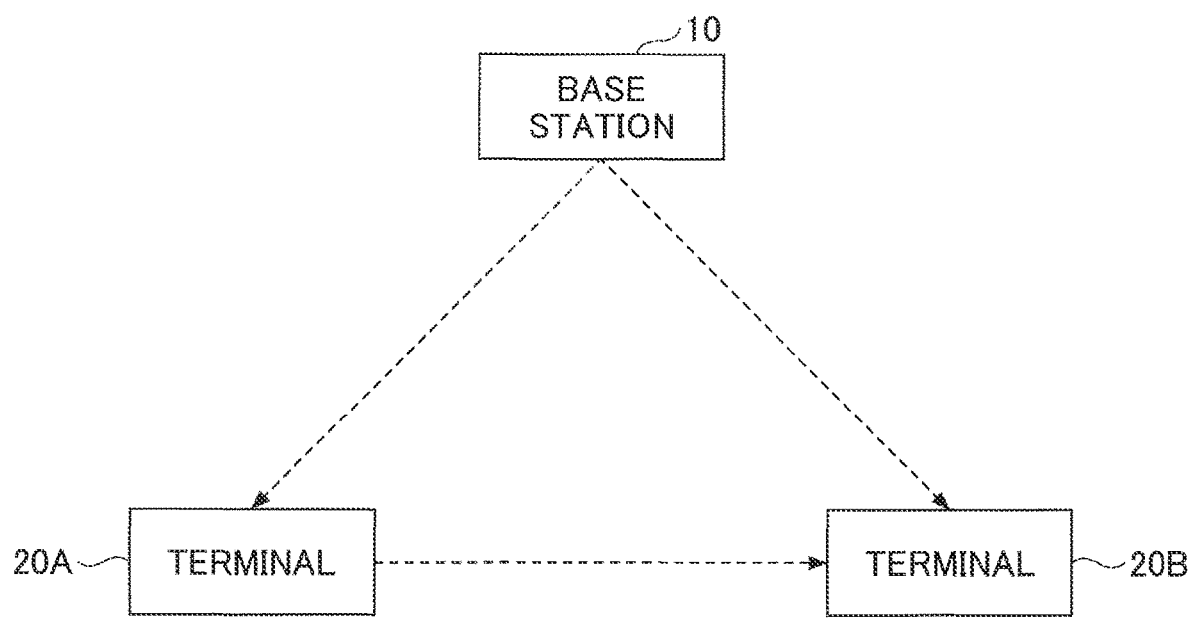
FIG. 1 is a diagram illustrating an example of a configuration of a radio communication system according to an embodiment.

FIG. 1 is a diagram illustrating an example of a configuration of a radio communication system according to an embodiment. As illustrated in FIG. 1, a radio communication system according to the embodiment includes a base station 10, a terminal 20A, and a terminal 20B. Note that, in practice, there may be a large number of terminals, but FIG. 1 illustrates the terminal 20A and the terminal 20B as an example.

In FIG. 1, the terminal 20A is intended to be the transmitting side and the terminal 20B is intended to be the receiving side. However, each of the terminal 20A and the terminal 20B is provided with both transmission function and reception function. In the following, when the terminals 20A, 20B, and the like are not particularly distinguished, it is simply described as the terminal 20 or the terminal. In FIG. 1, for example, a case is indicated in which both the terminal 20A and the terminal 20B are within the coverage. However, the operation according to this embodiment can be applied to a case in which all the terminals 20 are within the coverage; a case in which some of the terminals 20 are within the coverage and other terminals 20 are outside the coverage; and a case in which all the terminals 20 are outside the coverage.

In the embodiments, the terminal 20 is, for example, a device installed in a vehicle such as an automobile and has a function of cellular communication as user equipment (UE) in the LTE or NR and a side link function. Additionally, the terminal 20 includes functions, such as a GPS device, a camera, various types of sensors, for obtaining report information (location, event information, or the like). The terminal 20 may be a typical mobile terminal (such as a smartphone). The terminal 20 may be an RSU. The RSU may be a UE-type RSU with UE functions, a BS-type RSU with base station functions (also referred to as gNB-type UE), or a relay station.

The terminal 20 need not be a single housing device. For example, even if various types of sensors are distributed in a vehicle, the device including the various types of sensors is the terminal 20. The terminal 20 need not include various types of sensors, and the terminal 20 may include a function for transmitting data to and receiving data from the various types of sensors.

The details of processing of sidelink transmission by the terminal 20 are basically the same as the details of processing of UL transmission in the LTE or NR. For example, the terminal 20 scrambles a code word of transmission data, modulates to generate complex-valued symbols, and maps the complex-valued symbols to one or two layers for precoding. The precoded complex-valued symbols are then mapped to a resource element to generate a transmission signal (e.g., CP-OFDM, DFT-s-OFDM) and the transmission signal is transmitted from each antenna port.

The base station 10 has a function of cellular communication as the base station 10 in LTE or NR, and the base station 10 has a function for enabling communication of the terminal 20 according to the embodiments (e.g., resource pool configuration or resource allocation). The base station 10 may be an RSU (gNB-type RSU), a relay station, or a terminal having a scheduling function.

In the radio communication system according to the embodiments, a signal waveform used by the terminal 20 for SL or UL may be OFDMA, SC-FDMA, or other signal waveforms. In the radio communication system according to the embodiments, as an example, a frame including a plurality of subframes (e.g., 10 subframes) is formed in the time direction, and the frequency direction is formed of a plurality of subcarriers. One subframe is an example of one transmission Time Interval (TTI). However, TTIs are not necessarily subframes. For example, a TTI may be in units of slots or mini-slots or other time domain units. In addition, the number of slots per subframe may be determined in accordance with the subcarrier spacing. The number of symbols per slot may be 14. In addition, one symbol may include a Cyclic Prefix (CP) which is a guard period to reduce inter-symbol interference caused by multipath.

(Overview of NR V2X)

In the following, an outline of transmission modes defined in NR V2X is described with reference to FIG. 2A through FIG. 2D.

Figure 2A:
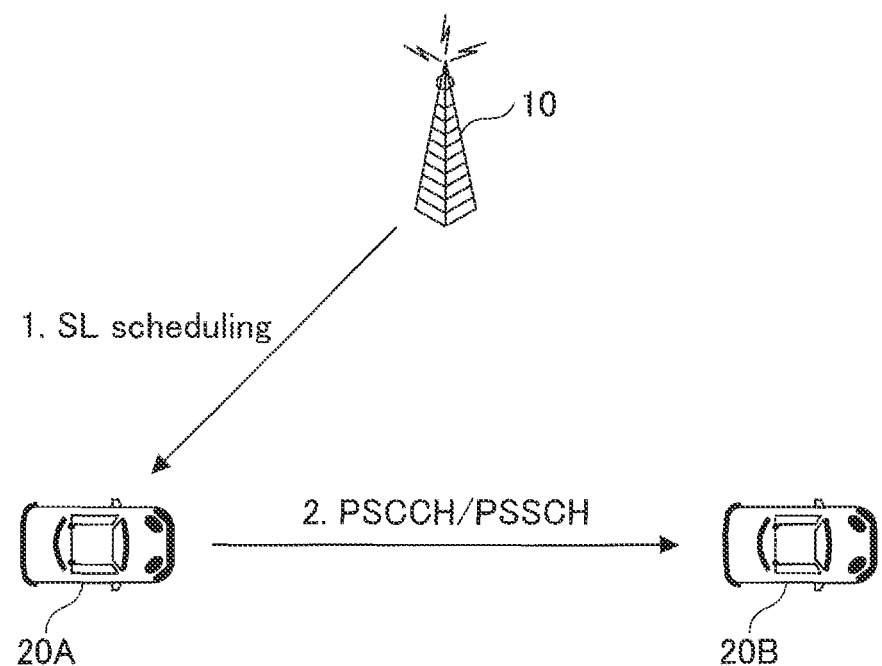
FIG. 2A is a diagram illustrating an outline of SL transmission mode 1 specified in NR V2X.

FIG. 2A is a diagram illustrating an outline of SL transmission mode 1 specified in NR V2X. In the SL transmission mode 1, the base station 10 schedules a transmission resource and assigns the transmission resource to the transmitting terminal 20A. The terminal 20A transmits a signal to the receiving terminal 20B with the assigned transmission resource. Note that a transmission mode may be referred to as a resource allocation mode, or may be referred by another name.

Figure 2B:
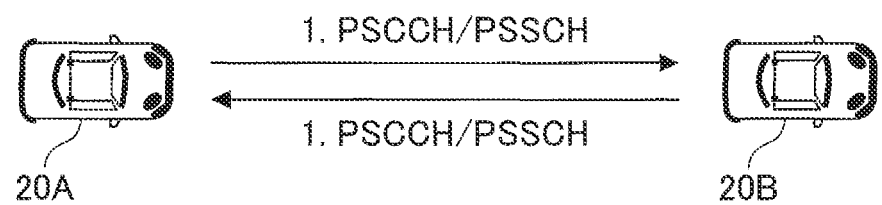
Figure 2C:
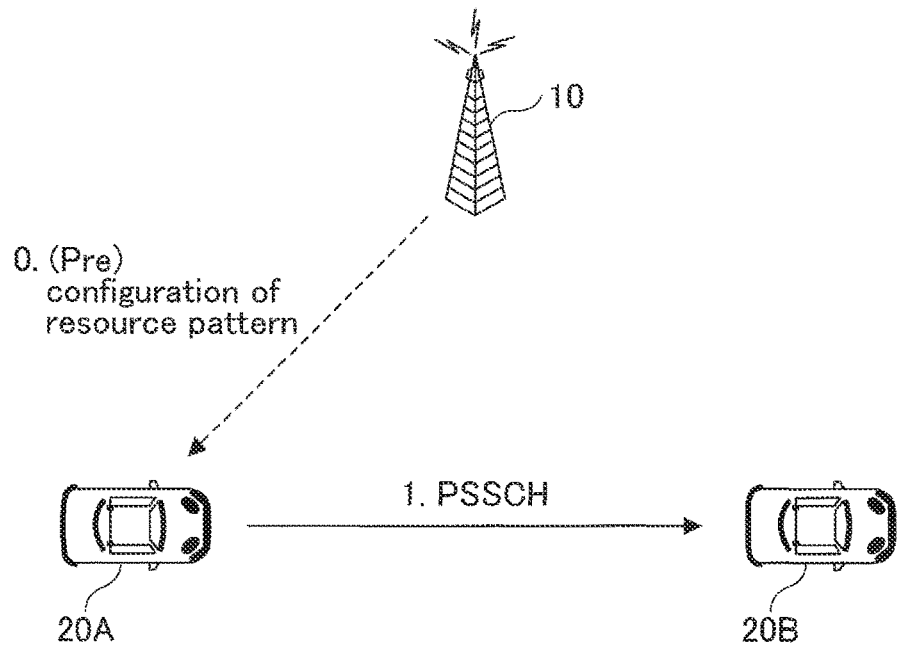
FIG. 2C is a diagram illustrating an outline of SL transmission mode 2c.
Figure 2D:
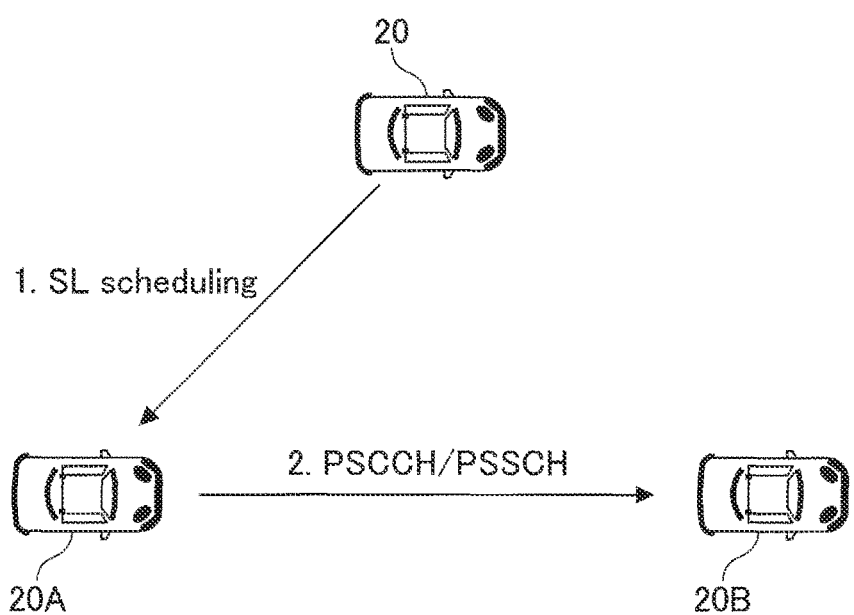
FIG. 2D is a diagram illustrating an outline of SL transmission mode 2d.

FIG. 2B, FIG. 2C, and FIG. 2D are diagrams illustrating an overview of SL transmission mode 2 as specified in NR V2X.

FIG. 2B is a diagram illustrating an outline of SL transmission mode 2a. In SL transmission mode 2a, for example, the transmitting terminal 20A autonomously selects a transmission resource and transmits a signal to the receiving terminal 20B with the selected transmission resource.

FIG. 2C is a diagram illustrating an outline of SL transmission mode 2c. In the SL transmission mode 2c, for example, the base station 10 preconfigures transmitting resources with a certain period/pattern for the terminal 20A (e.g., by a higher layer parameter), and the terminal 20A transmits the signal to the receiving terminal 20B by using the transmitting resources with the predetermined period/pattern. Here, instead of the base station 10 preconfiguring the transmitting resources with the certain period/pattern for the terminal 20A, for example, the transmitting resources with the certain period/pattern may be configured for the terminal 20A according to a technical specification.

FIG. 2D is a diagram illustrating an outline of SL transmission mode 2d. In SL transmission mode 2d, for example, the terminal 20 performs an operation that is the same as an operation of the base station 10. Specifically, the terminal 20 schedules transmission resources and assigns the transmission resources to the transmitting terminal 20A. The terminal 20A may perform transmission to the receiving terminal 20B by using the assigned communication resources. That is, the terminal 20 may control the transmission of another terminal 20 (e.g., the terminal 20A and/or the terminal 20B).

For NR V2X SL transmission mode 2, short term resource reservation based resource selection has been proposed.

Figure 3:
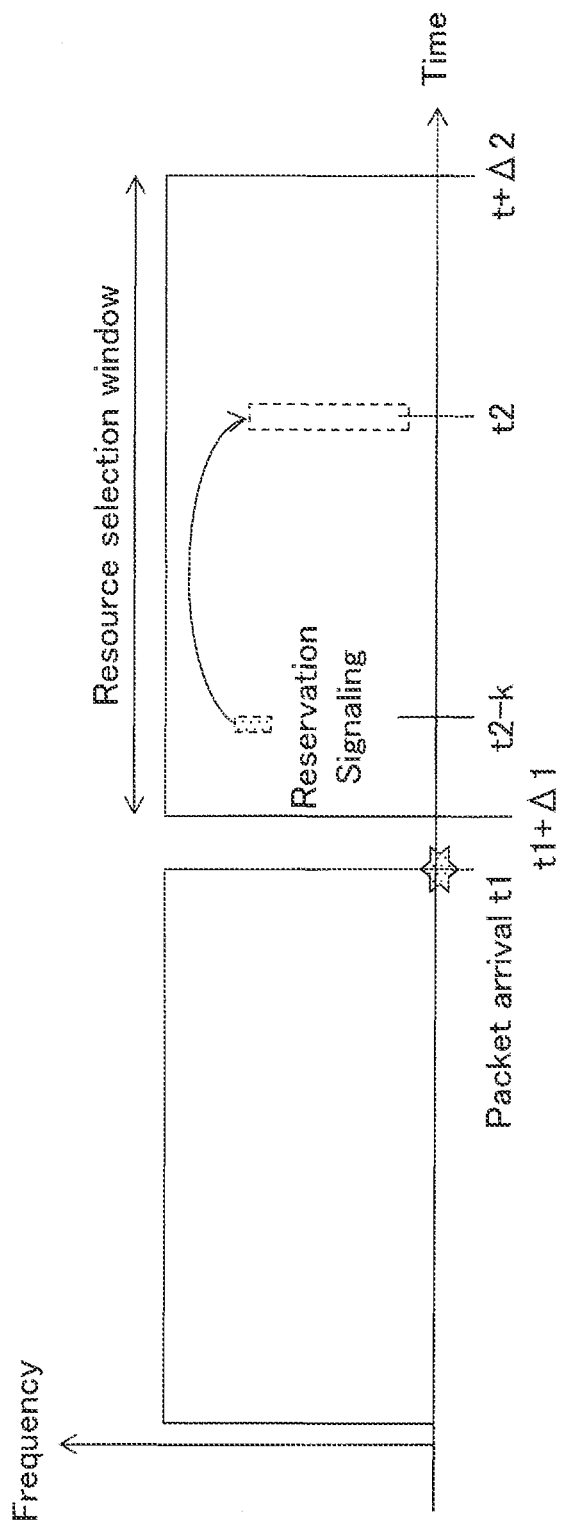
FIG. 3 is a diagram illustrating an example of a short term resource reservation based resource selection method.

FIG. 3 is a diagram illustrating an example of a resource selection method based on a short term resource reservation. As illustrated in the example of FIG. 3, for example, when a packet occurs at timing t1 at the terminal 20, the terminal 20 selects the transmit resource within the resource selection window [t1+Δt1, t1+Δt2]. As illustrated in the example of FIG. 3, when the timing corresponding to the selected resource for packet transmission is t2, the timing of the resource for the transmission of the Reservation Signaling may be t2-k. The information in the reserve signal may be only reservation information for a resource, or it may be reservation information for a resource and other information (e.g., scheduling information or transport blocks). In the figures of the present invention, PSCCH transmitting a reservation signal and PSCCH/PSSCH transmitting any other information (e.g., scheduling information or transport block) are illustrated as separate channels. However, a reservation signal and the whole of another signal or a part of the other signal may be transmitted on the same channel.

In SL transmission mode 2 of NR V2X, it is assumed that a resource reservation is to be supported at least for a sidelink transmission resource for blind retransmission of a transport block (TB) (retransmission such as repetition, other than a retransmission based on feedback information as in the case of HARQ). Here, blind retransmission of the TB can be repeated transmissions of a set of TBs in a Physical Sidelink Control Channel (PSCCH) and a Physical Sidelink Shared Channel (PSSCH), or, for example, only the PSSCH transmission may be repeated as in the repetition in NR Rel-15.

In addition, in SL transmission mode 2 of NR V2X, a resource reservation by using signaling for a retransmission, based on a feedback, of a transport block on a Physical Sidelink Shared Channel (PSSCH), where the signaling is associated with a transmission of a transport block prior to the retransmission of the transport block, is assumed to be supported.

In the embodiments described below, the maximum number of transmissions of a transport block is assumed to be R. In addition, the maximum number of candidate resources selected by the terminal 20 for one or more transport blocks is assumed to be N.
(Problem)

In the case of performing blind retransmission of a transport block (TB) or retransmission of the transport block based on Hybrid Automatic Repeat Request-Acknowledgement (HARQ-ACK), it has been unclear which resource is to be selected as a resource used for the retransmission.
(Proposal A)

The terminal 20 may reserve a resource for the initial transmission of a transport block (Initial transmission) and resources for one or more retransmissions of the transport block at the same time. Alternatively, the terminal 20 may reserve all resources for retransmissions of the transport block at the same time. In the following embodiments, although reservation of a resource for the initial transmission of the transport block and resources for one or more retransmissions of the transport block is described, the embodiments may be applied to reservation of all resources for retransmissions of the transport block. Note that in the following embodiments, for example, "the terminal 20 reserves a resource" may be an operation of the terminal 20 to transmit a signal indicating that the terminal 20 occupies (or uses) the resource, to the other terminal(s) 20 and/or the base station 10. For example, "the terminal 20 cancels a reservation of a resource" may be an operation of the terminal 20 to transmit a signal indicating that terminal 20 does not occupy (or does not use) the reserved resource, to the other terminal(s) 20 and/or the base station 10.
(Proposal A-1)

Figure 4:
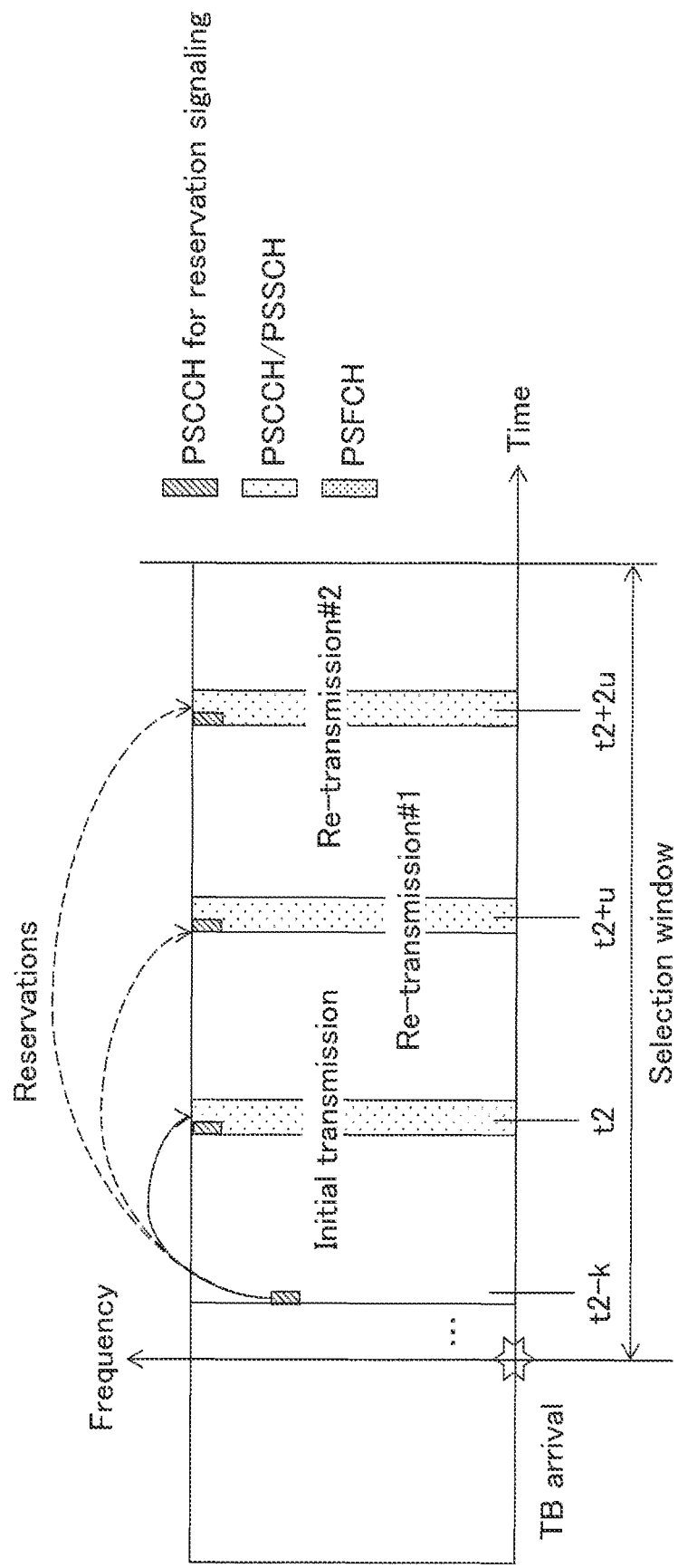
FIG. 4 is a diagram illustrating an example in which a terminal simultaneously reserves a resource for an initial transmission and a resource for a retransmission.

FIG. 4 is a diagram illustrating an example in which the terminal 20 reserves a resource for the initial transmission of a transport block and one or more resources for one or more retransmissions of the transport block at the same time. As illustrated in FIG. 4, for example, the terminal 20 may configure a resource at a timing t2 in the time domain as the resource for the initial transmission of the transport block, and select (reserve) resources at timings t2+r×u in the time domain as the resources for retransmissions of the transport block. Here, r may be assumed as r∈{1, 2, . . . }, and u may be the time interval between the initial transmission of the transport block and the first retransmission of the transport block. The value of u may be specified in advance, for example, in a technical specification document or the like; may be (pre)configured by higher layer signaling (e.g., by an RRC signal); may be configured by PC5-RRC as sidelink RRC signaling; may be indicated by Downlink Control Information (DCI), Sidelink Control Information (SCI), or Medium Access Control Control Element (MAC-CE); or may depend on the implementation of the terminal. The "r" represents the index of a retransmission. Here, r may be less than or equal to R and less than or equal to N.

Furthermore, t2+r×u may be set so as not to exceed a selection window illustrated in FIG. 4, and if t2+r×u exceeds the selection window, it may be specified that retransmission with a resource exceeding the selection window is not to be performed. The resource for the initial transmission of the transport block and the resources for one or more retransmissions of the transport block may be specified by a reservation signal transmitted via a PSSCH.

Here, in the case where the granularity of the resources is based on units of time-frequency resource patterns (TFRP) in the time domain and the frequency domain, the units of resources when reserving the resources may be a single TFRP or multiple TFRPs.
(Proposal A-2)

FIG. 5 to FIG. 8 are diagrams illustrating other examples in which the terminal 20 reserves a resource for the initial transmission of a transport block and one or more resources for one or more retransmissions of the transport block at the same time (simultaneously). As illustrated in FIG. 5 to FIG. 8, for example, the terminal 20 may configure a resource at a timing t2 in the time domain as the resource for the initial transmission of the transport block, and select one or more resources to be used later in time than timing t2 in the time domain as one or more resources for one or more retransmissions of the transport block.

In this case, the one or more resources for the one or more retransmissions of the transport block that are to be selected by the terminal 20 may be defined in the time domain (X) and frequency domain (Y) as follows.

Time Domain (X):
  The time interval between two adjacent resources in the time domain for two retransmissions of the transport block may be the same as the time interval between the resource for the initial transmission of the transport block and the first retransmission of the transport block.
  The time interval between two adjacent resources in the time domain for two retransmissions of the transport block may be different from the time interval between the resource for the initial transmission of the transport block and the first retransmission of the transport block. In this case, for example, one or more resources for one or more retransmissions in the time domain may be specified by a bitmap.

Frequency Domain (Y):
  One or more frequency resources for one or more retransmissions of the transport block may be the same as the frequency resource for the initial transmission of the transport block in the frequency domain.
  One or more frequency resources for one or more retransmissions of the transport block may be different from the frequency resource for the initial transmission of the transport block in the frequency domain. In this case, multiple frequency resources for multiple retransmissions other than the frequency resource for the initial transmission of the transport block may be the same frequency resource.
  The frequency resource for the initial transmission of the transport block and one or more frequency resources for one or more retransmissions of the transport block may be frequency resources different from each other in the frequency domain.
  Some of the frequency domain resources among one or more frequency resources in the frequency domain for one or more retransmissions of the transport block may be the same as the frequency resource for the initial transmission of the transport block.

One or more resources for one or more retransmissions of the transport block that are to be selected by the terminal 20 may be specified by any combination of a configuration in the time domain (X) and a configuration of the frequency domain (Y) described above.

Figure 5:
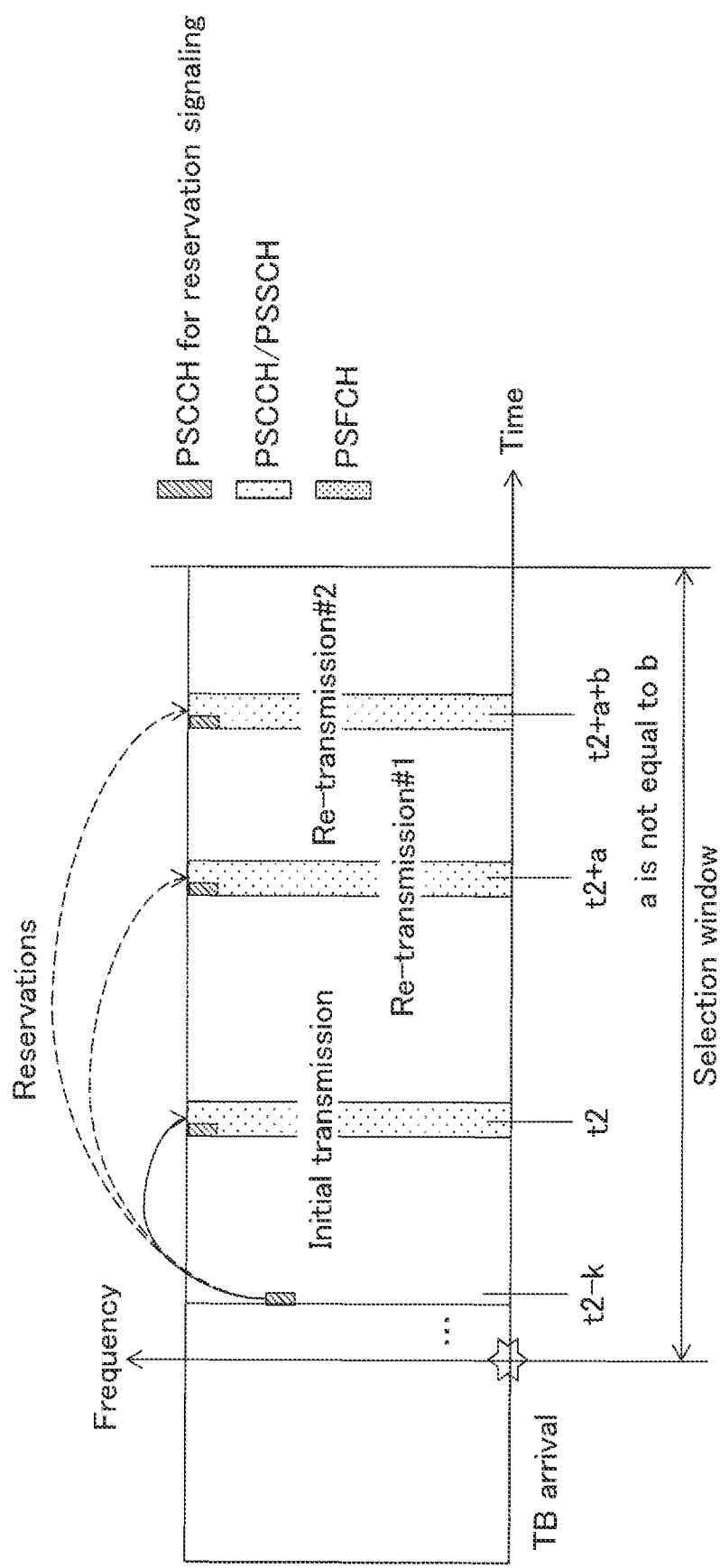
FIG. 5 is a diagram illustrating an example in which a terminal simultaneously reserves a resource for an initial transmission and a resource for a retransmission.

For example, in the example in FIG. 5, the time interval between two adjacent resources (Retransmission #1 and Retransmission #2) in the time domain for two retransmissions of the transport block is different from the time interval between the resource for the initial transmission of the transport block (Initial transmission) and the first retransmission of the transport block (Retransmission #1). Furthermore, in the example in FIG. 5, in the frequency domain, the multiple frequency resources (Retransmission #1 and Retransmission #2) for multiple retransmissions of the transport block are the same as the frequency resource for the initial transmission of the transport block (Initial transmission).

Figure 6:
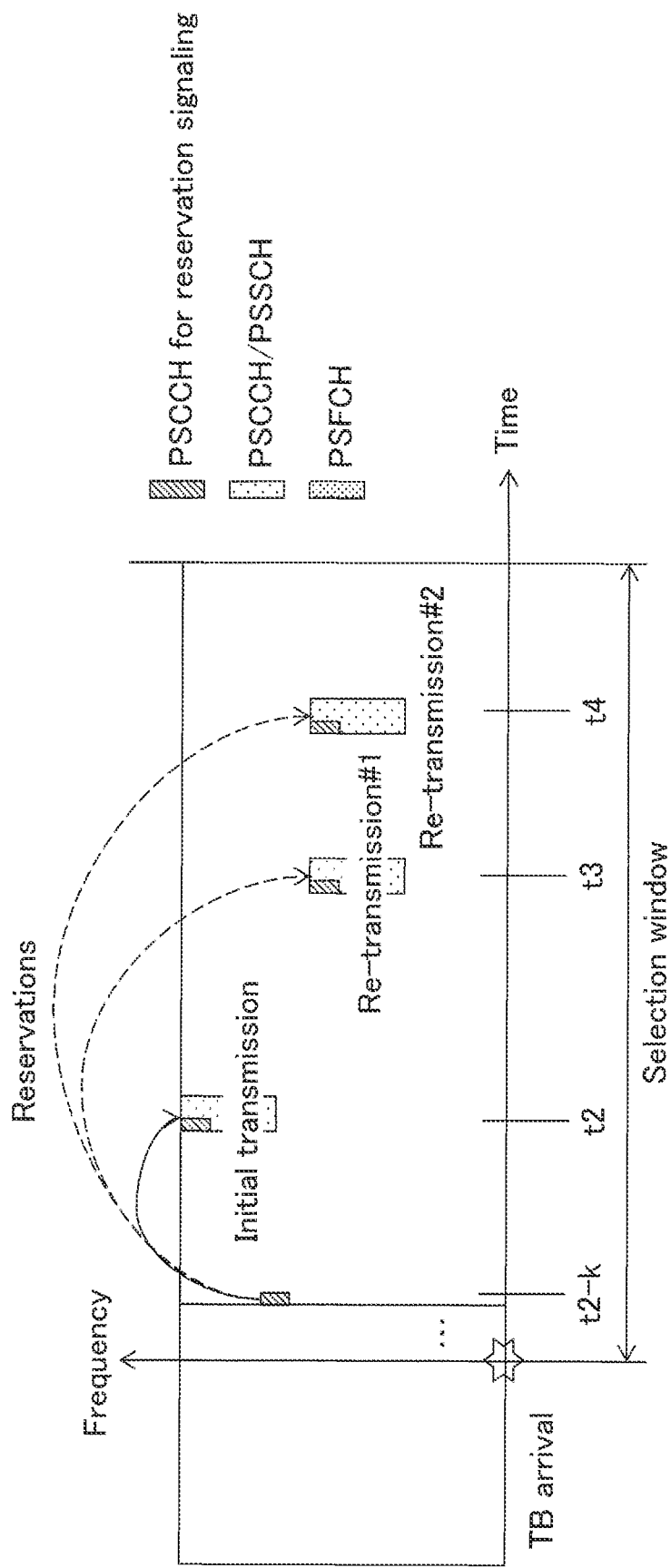
FIG. 6 is a diagram illustrating an example in which a terminal simultaneously reserves a resource for an initial transmission and a resource for a retransmission.

For example, in the example in FIG. 6, the time interval between two adjacent resources (Retransmission #1 and Retransmission #2) in the time domain for two retransmissions of the transport block is different from the time interval between the resource for the initial transmission of the transport block (Initial transmission) and the first retransmission of the transport block (Retransmission #1). Furthermore, in the example in FIG. 6, in the frequency domain, the multiple frequency resources (Retransmission #1 and Retransmission #2) for multiple retransmissions of the transport block are different from the frequency resource for the initial transmission of the transport block (Initial transmission). In addition, in the example in FIG. 6, the multiple frequency resources (Retransmission #1 and Retransmission #2) for multiple retransmissions of the transport block are the same frequency resource.

Figure 7:
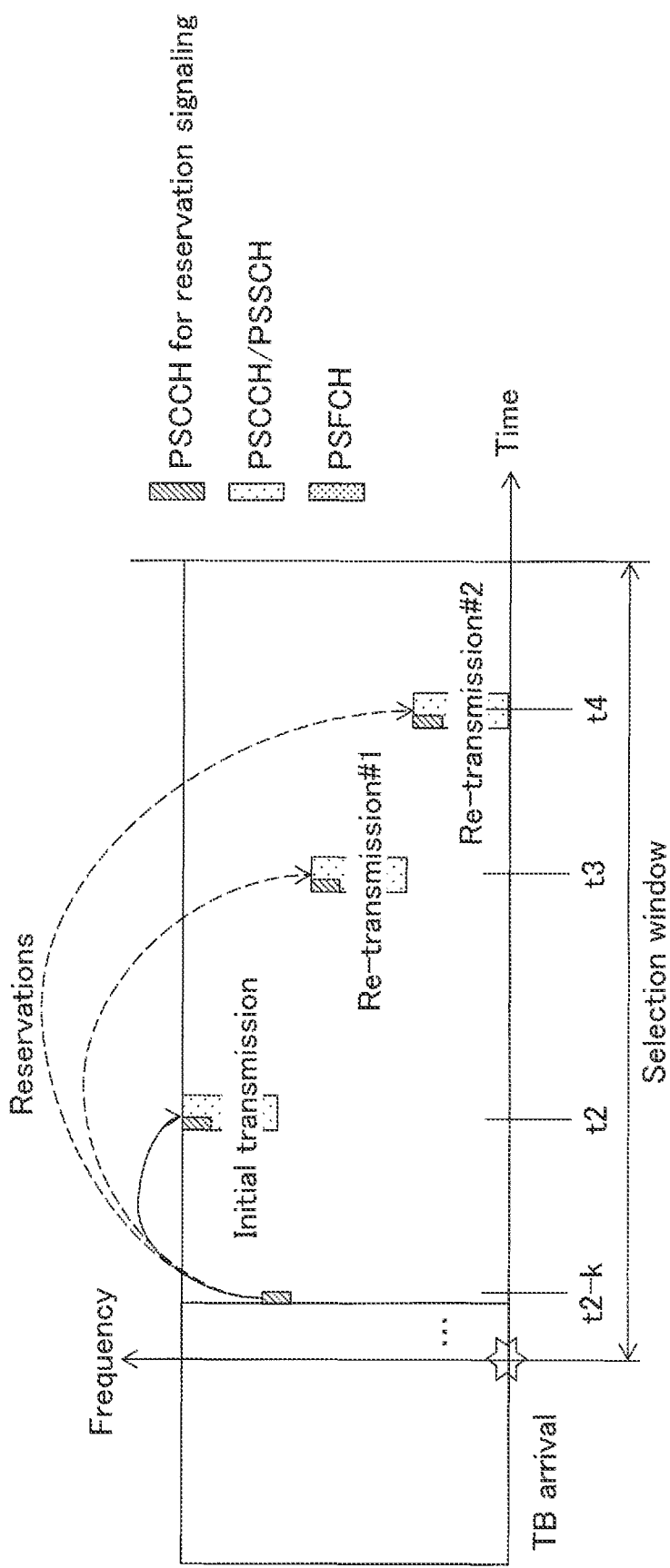
FIG. 7 is a diagram illustrating an example in which a terminal simultaneously reserves a resource for an initial transmission and a resource for a retransmission.

For example, in the example in FIG. 7, the time interval between two adjacent resources (Retransmission #1 and Retransmission #2) in the time domain for two retransmissions of the transport block is different from the time interval between the resource for the initial transmission of the transport block (Initial transmission) and the first retransmission of the transport block (Retransmission #1). Furthermore, in the example in FIG. 7, in the frequency domain, the frequency resource for the initial transmission of the transport block (Initial transmission) and the multiple frequency resources (Retransmission #1 and Retransmission #2) for multiple retransmissions of the transport block are frequency resources different from each other.

Figure 8:
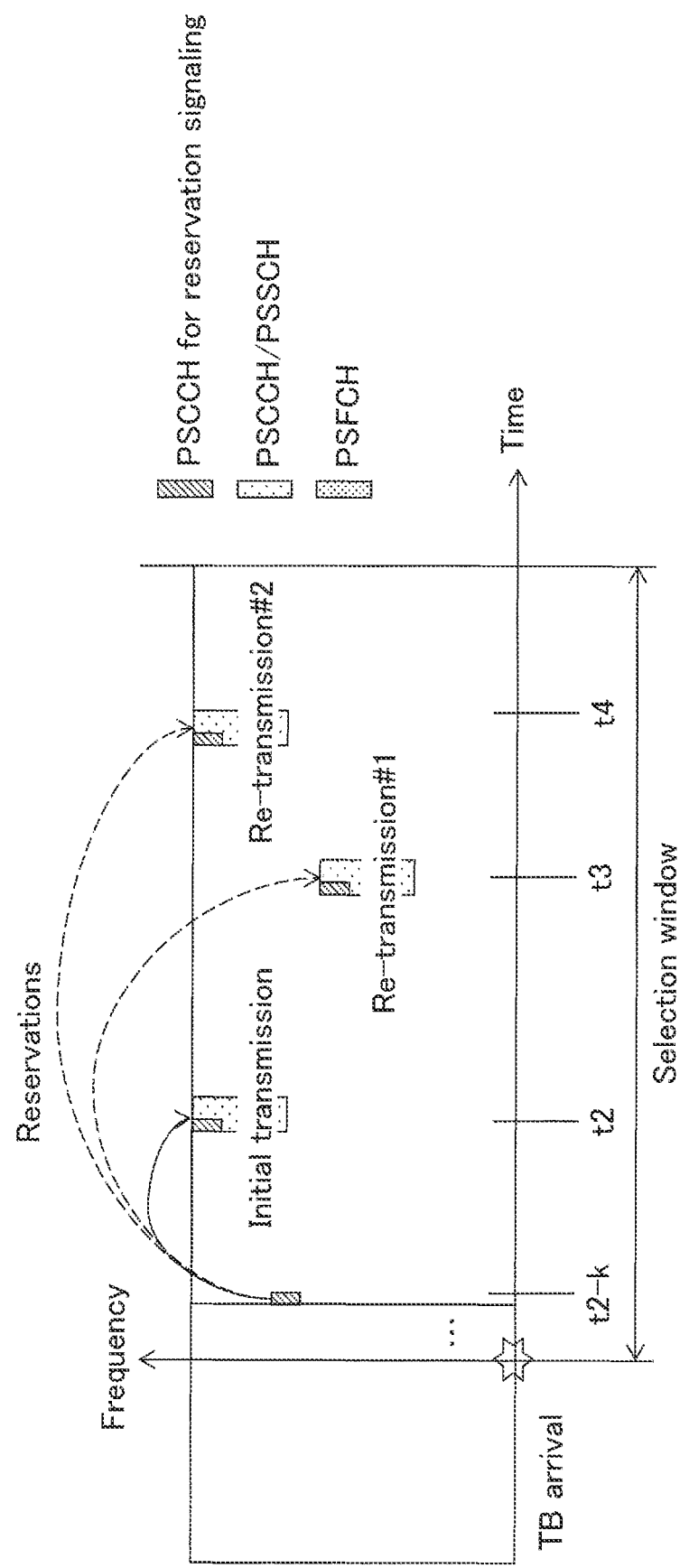
FIG. 8 is a diagram illustrating an example in which a terminal simultaneously reserves a resource for an initial transmission and a resource for a retransmission.

For example, in the example in FIG. 8, the time interval between two adjacent resources (Retransmission #1 and Retransmission #2) in the time domain for two retransmissions of the transport block is different from the time interval between the resource for the initial transmission of the transport block (Initial transmission) and the first retransmission of the transport block (Retransmission #1). Furthermore, in the example in FIG. 8, among the two resources in the time domain (Retransmission #1 and Retransmission #2) for two retransmissions of the transport block, the frequency band of the resource placed in later in the time domain (Retransmission #2) is the same as the frequency band of the resource for the initial transmission of the transport block (Initial transmission).

Note that in the case where r represents the index of a retransmission, r is less than or equal to R and less than or equal to N.

Resources in the time domain for retransmissions of the transport block may be configured so as not to exceed the selection window. In the case where a resource in the time domain for retransmission of the transport block exceeds the selection window, it may be specified that a retransmission is not to be performed with the resource in the time domain exceeding the selection window.

A resource for the initial transmission of the transport block and one or more resources for one or more retransmissions of the transport block may be specified by a reservation signal (reservation signaling) transmitted on a PSCCH.

In the case where the granularity of the resources is based on units of time-frequency resource patterns (TFRP) in the time domain and the frequency domain, the units of resources when reserving the resources may be a single TFRP or multiple TFRPs.

(Proposal B)

The terminal 20 may reserve a resource for the initial transmission of a transport block, and/or a resource for a retransmission of the transport block may be reserved by a prior transmission or a prior retransmission of the transport block.

(Proposal B-1)

Figure 9:
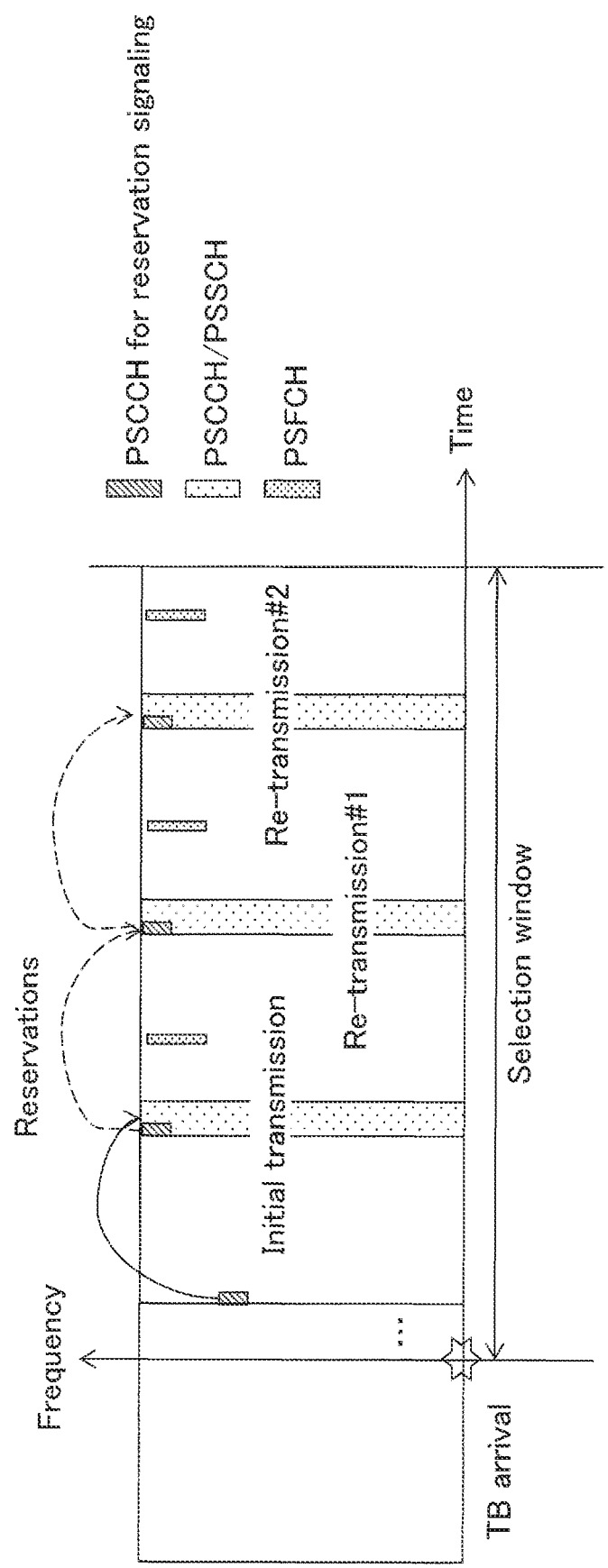
FIG. 9 is a diagram illustrating an example in which a resource for the (r)th retransmission is specified by a PSCCH for the (r−1)th retransmission.

FIG. 9 is a diagram illustrating an example in which a resource for the (r)th retransmission of the transport block is specified by a PSCCH for the (r−1)th retransmission of the transport block. For example, the resource for the initial transmission of the transport block (Initial transmission) may be specified by a reservation signal transmitted via a PSCCH.

In this case, one or more resources (Retransmission #1 and Retransmission #2) for one or more retransmissions of the transport block that are selected by the terminal 20 may be defined in the time domain (X) and frequency domain (Y) as follows.

Time Domain (X):
  The time interval between two adjacent resources in the time domain for two retransmissions of the transport block may be the same as the time interval between the resource for the initial transmission of the transport block and the first retransmission of the transport block.
  The time interval between two adjacent resources in the time domain for two retransmissions of the transport block may be different from the time interval between the resource for the initial transmission of the transport block and the first retransmission of the transport block. In this case, for example, one or more resources for one or more retransmissions in the time domain may be specified by a bitmap.

Frequency Domain (Y):
  One or more frequency resources for one or more retransmissions of the transport block may be the same as the frequency resource for the initial transmission of the transport block in the frequency domain.
  One or more frequency resources for one or more retransmissions of the transport block may be different from the frequency resource for the initial transmission of the transport block in the frequency domain. In this case, multiple frequency resources for multiple retransmissions other than the frequency resource for the initial transmission of the transport block may be the same frequency resource.
  The frequency resource for the initial transmission of the transport block and one or more frequency resources for one or more retransmissions of the transport block may be frequency resources different from each other in the frequency domain.
  Some of the frequency domain resources among one or more frequency resources in the frequency domain for one or more retransmissions of the transport block may be the same as the frequency resource for the initial transmission of the transport block.

One or more resources for one or more retransmissions of the transport block that are to be selected by the terminal 20 may be specified by any combination of a configuration in the time domain (X) and a configuration of the frequency domain (Y) described above.

In the case where the granularity of the resources is based on units of time-frequency resource patterns (TFRP) in the time domain and the frequency domain, the units of resources when reserving the resources may be a single TFRP or multiple TFRPs.

(Proposal B-2)

Figure 10:
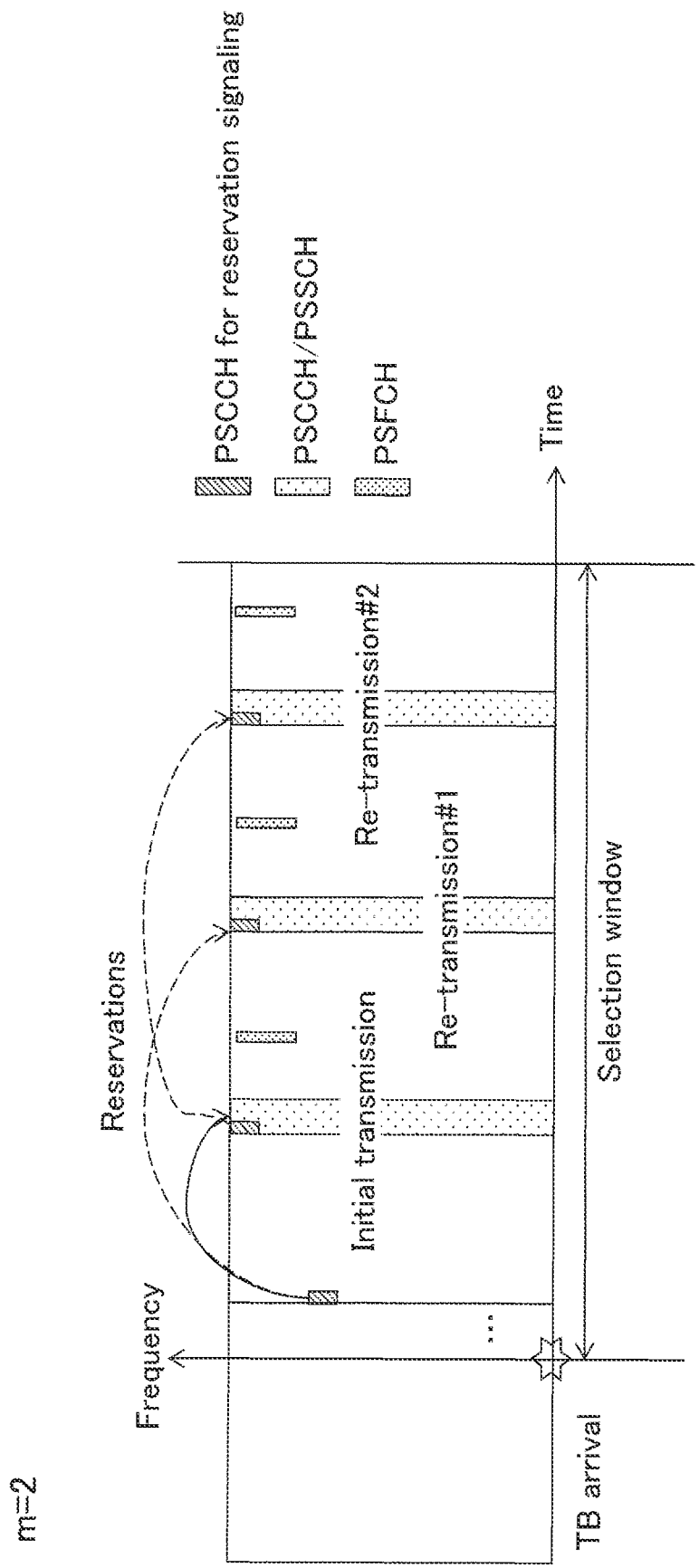
FIG. 10 is a diagram illustrating an example in which a resource for the (r)th retransmission is specified by a PSCCH for the (r−m)th retransmission.

FIG. 10 is a diagram illustrating an example in which a resource for the (r)th retransmission of the transport block is specified in a PSCCH for the (r−m)th retransmission of the transport block. Here, the value of m may be, for example, specified in advance in a technical specification or the like; may be (pre)configured by higher layer signaling (e.g., by an RRC signal); may be configured by PC5-RRC as sidelink RRC signaling; may be indicated by Downlink Control Information (DCI), Sidelink Control Information (SCI), or Medium Access Control Control Element (MAC-CE); or may depend on the implementation of the terminal. For example, the resource for the initial transmission of the transport block may be specified by a reservation signal transmitted via a PSCCH.

The case of m=1 corresponds to the case of Proposal B-1. In the case in which m is greater than 1, the reservation signal transmitted on the first PSCCH may specify one resource for the initial transmission and resources for (m−1) retransmissions (i.e., the first, . . . , (m−2)th, and (m−1)th retransmissions). Proposal A-1 or Proposal A-2 described above may be applied to the first m transmissions (i.e., the initial transmission, the first retransmission . . . , (m−2)th retransmission, and (m−1)th retransmission).

In this case, one or more resources for one or more retransmissions of the transport block that are to be selected by the terminal 20 may be defined in the time domain (X) and frequency domain (Y) as follows.

Time Domain (X):
  The time interval between two adjacent resources in the time domain for two retransmissions of the transport block may be the same as the time interval between the resource for the initial transmission of the transport block and the first retransmission of the transport block.
  The time interval between two adjacent resources in the time domain for two retransmissions of the transport block may be different from the time interval between the resource for the initial transmission of the transport block and the first retransmission of the transport block. In this case, for example, one or more resources for one or more retransmissions in the time domain may be specified by a bitmap.

Frequency Domain (Y):
  One or more frequency resources for one or more retransmissions of the transport block may be the same as the frequency resource for the initial transmission of the transport block in the frequency domain.
  One or more frequency resources for one or more retransmissions of the transport block may be different from the frequency resource for the initial transmission of the transport block in the frequency domain. In this case, multiple frequency resources for multiple retransmissions other than the frequency resource for the initial transmission of the transport block may be the same frequency resource.
  The frequency resource for the initial transmission of the transport block and one or more frequency resources for one or more retransmissions of the transport block may be frequency resources different from each other in the frequency domain.
  Some of the frequency domain resources among one or more frequency resources in the frequency domain for one or more retransmissions of the transport block may be the same as the frequency resource for the initial transmission of the transport block.

One or more resources for one or more retransmissions of the transport block that are to be selected by the terminal 20 may be specified by any combination of a configuration in the time domain (X) and a configuration of the frequency domain (Y) described above.

In the case where the granularity of the resources is based on units of time-frequency resource patterns (TFRP) in the time domain and the frequency domain, the units of resources when reserving the resources may be a single TFRP or multiple TFRPs.

(Proposal C)

A resource for a retransmission of the transport block may be activated by HARQ feedback, namely, negative acknowledgment (NACK), in response to the initial transmission of the transport block by the terminal 20 (the terminal 20 may be configured to be capable of using the resource, and another terminal 20 may be configured to be incapable of using the resource). Alternatively, in the case of not receiving ACK, the other terminal 20 may assume that the resource for retransmission of the transport block has been activated. In the case of not receiving NACK or in the case of having received ACK, the other terminal 20 may assume that the resource for retransmission of the transport block has not been activated.

Figure 11:
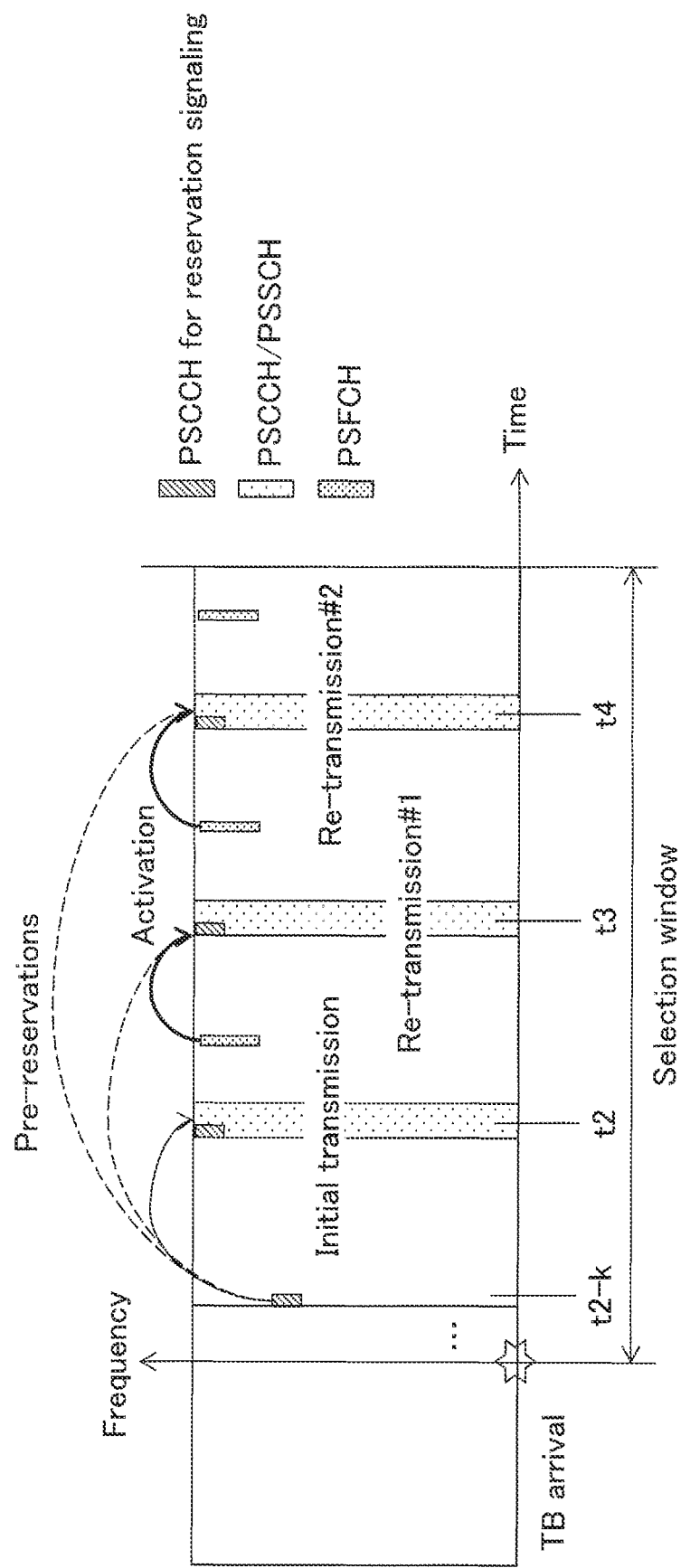
FIG. 11 is an example in which a resource for retransmission is tentatively reserved.

FIG. 11 is a diagram illustrating an example of Proposal C. In an example illustrated in FIG. 11, by a reservation signal received via a PSCCH at a timing t2-$k$, a resource for the initial transmission of the transport block at a timing t2 (Initial Transformation) is specified, and a resource for a retransmission of the transport block at a timing t3 (Retransmission #1) and a resource for a retransmission of the transport block at a timing t4 (Retransmission #2) are tentatively reserved (pre-reserved). Thereafter, when the terminal 20 receives NACK via a Physical Sidelink Feedback Channel (PSFCH), the pre-reserved resources for retransmissions of the transport block associated with the PSFCH are activated (become usable for retransmissions of the transport block by the terminal 20). In the case where the terminal 20 receives ACK via the PSFCH, a retransmission of the transport block becomes unnecessary. Accordingly, the pre-reservation for the resources for retransmissions of the transport block may be canceled.

The PSCCH/PSSCH resource for the (r)th retransmission is to be placed later in time than the PSFCH corresponding to the (r−1)th transmission/retransmission. The resource for the (r)th retransmission is activated by the HARQ feedback for the (r−1)th retransmission. Here, in the case of r=1, the HARQ feedback that activates the resource of the (r)th retransmission corresponds to the HARQ feedback in response to the initial transmission.

In the case where a transmission of the transport block has failed (e.g., in the case where NACK is received), the resource for a retransmission specified by the PSCCH is activated. In the case of using a pre-reserved resource, it may be unnecessary to perform sensing.

Before the pre-reserved resource is activated, a resource for a retransmission that has been reserved by the terminal 20 may be available for pre-reservation by another terminal 20, or may be unavailable for pre-reservation by another terminal 20. Here, the pre-reservation may be an operation of the terminal 20 to find a resource for a future transmission, and at the pre-reservation stage, the terminal 20 may be unable to use the resource. After the pre-reserved resource is activated by the HARQ feedback, the terminal 20 can use the resource.

In the case where the granularity of the resources is based on units of time-frequency resource patterns (TFRP) in the time domain and the frequency domain, the units of resources when reserving the resources may be a single TFRP or multiple TFRPs.

Here, Proposal C may be combined with Proposal A, or Proposal C may be combined with Proposal B. In the case of combining Proposal C with Proposal A, or in the case of combining Proposal C with Proposal B, a reservation in Proposal A and Proposal B may be replaced with a pre-reservation.

The example illustrated in FIG. 11 is an example in which Proposal C is combined with Proposal A-2. For example, in the example in FIG. 11, by a reservation signal received via a PSCCH at a timing t2-$k$, a resource for the initial transmission of a transport block at a timing t2 (Initial Transformation) is specified, and a resource for a retransmission of the transport block at a timing t3 (Retransmission #1) and a resource for a retransmission of the transport block at a timing t4 (Retransmission #2) are pre-reserved. Thereafter, when the terminal 20 receives NACK via a Physical Sidelink Feedback Channel (PSFCH), the pre-reserved resources for retransmissions of the transport block associated with the PSFCH are activated. The time interval between two adjacent pre-reserved resources in the time domain (Retransmission #1 and Retransmission #2) may be different from the time interval between the resource for the initial transmission of the transport block (Initial transmission) and a resource (Retransmission #1) that is pre-reserved for the first retransmission of the transport block. Furthermore, in the example in FIG. 11, in the frequency domain, multiple frequency resources (Retransmission #1 and Retransmission #2) for multiple retransmissions to be pre-reserved are the same as the frequency resource for the initial transmission of the transport block (Initial transmission).

Figure 12:
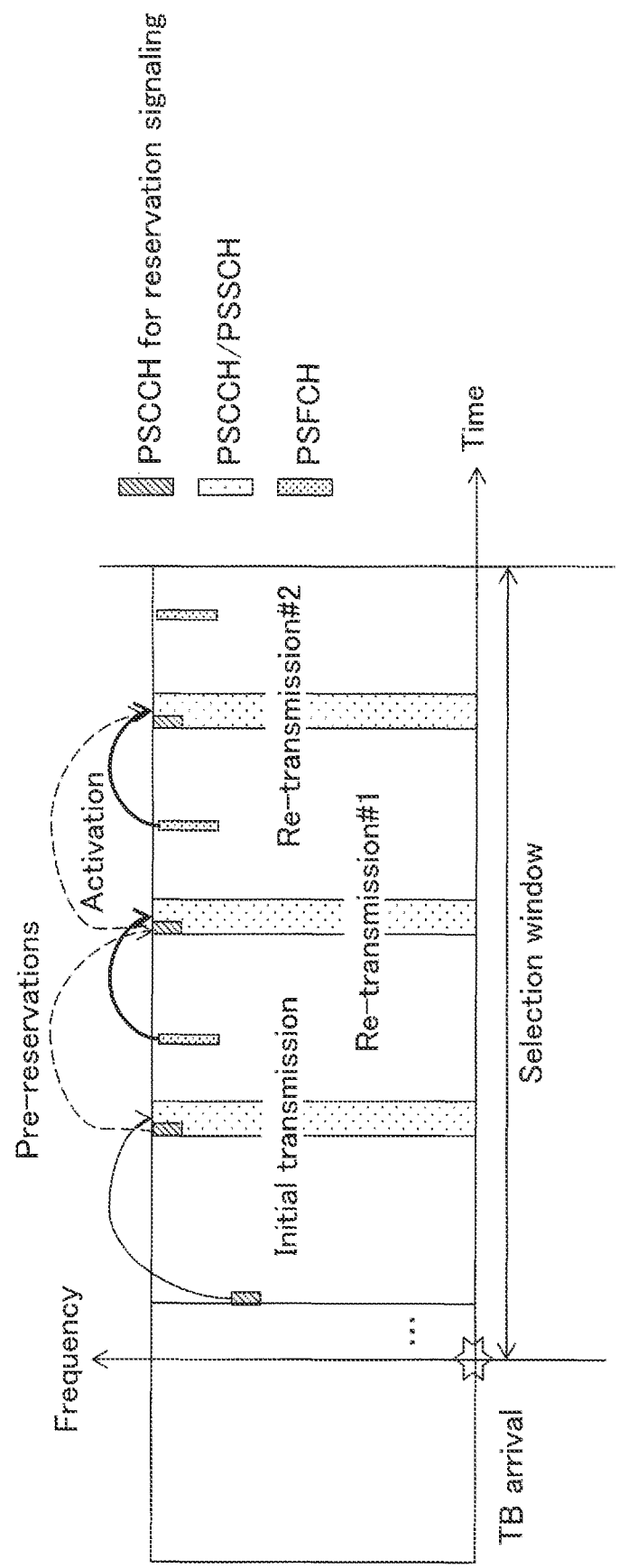
FIG. 12 is an example in which a resource for retransmission is tentatively reserved.

The example illustrated in FIG. 12 is an example in which Proposal C is combined with Proposal B-1. For example, the resource (Initial transmission) for the initial transmission of a transport block may be specified by a reservation signal transmitted via a PSCCH. In this case, the resource for the first retransmission of the transport block may be pre-reserved by the PSCCH for the initial transmission of the transport block. Thereafter, the resource for the (r)th retransmission of the transport block may be pre-reserved by the PSCCH for the (r−1)th retransmission of the transport block. When the terminal 20 receives NACK via a Physical Sidelink Feedback Channel (PSFCH), the pre-reserved resource for retransmission of the transport block associated with the PSFCH may be activated.

Figure 13:
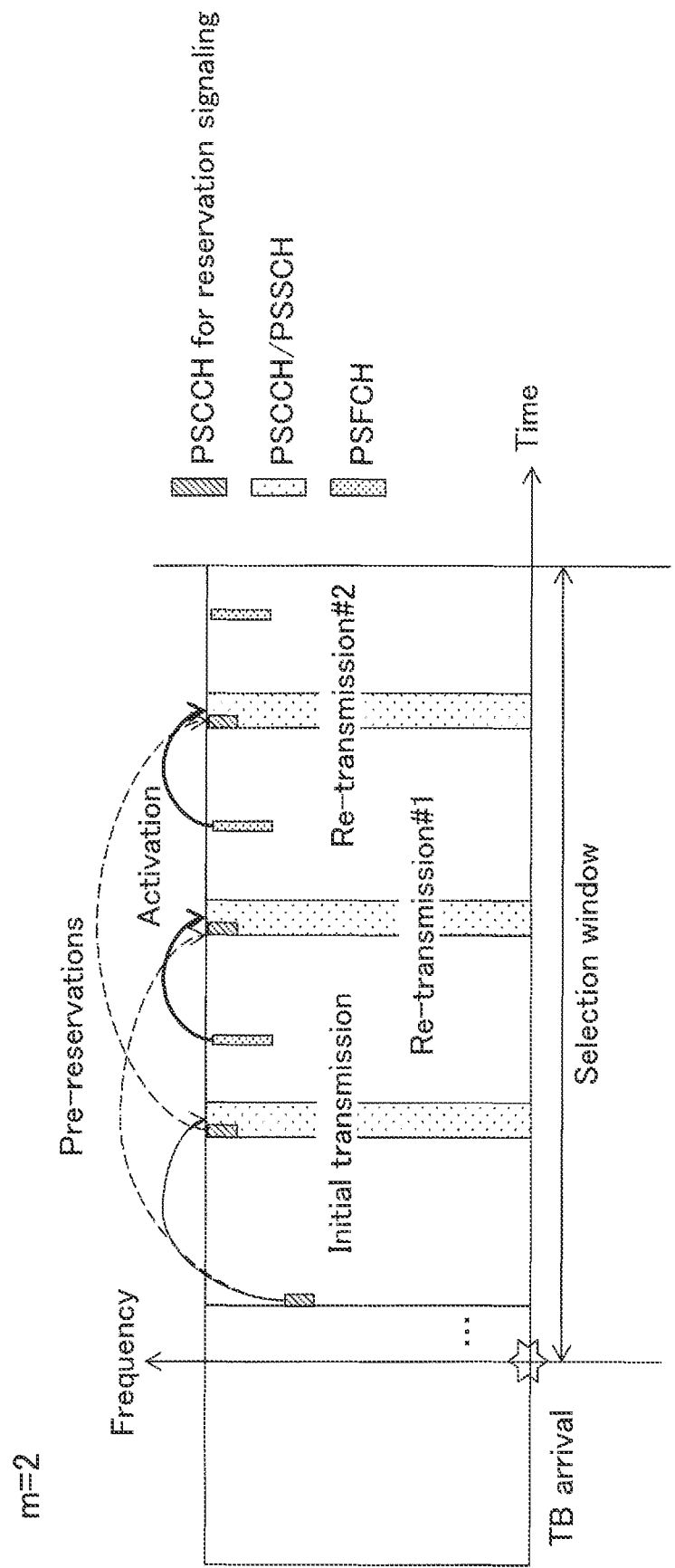
FIG. 13 is an example in which a resource for retransmission is tentatively reserved.

The example illustrated in FIG. 13 is an example in which Proposal C is combined with Proposal B-2. For example, the resource (Initial transmission) for the initial transmission of a transport block may be specified by a reservation signal transmitted via a PSCCH. In this case, the resource for the (r)th retransmission of the transport block may be pre-reserved by the PSCCH for the (r−m)th retransmission of the transport block. When the terminal 20 receives NACK via a Physical Sidelink Feedback Channel (PSFCH), the pre-reserved resource for retransmission of the transport block associated with the PSFCH may be activated.

According to the method of Proposal A-1 and the method of Proposal B-1, as a resource for data retransmission, the same resource in the frequency domain may be repeatedly selected in the time domain. Accordingly, the overhead of a control signal for indicating a resource selection can be reduced.

According to the method of Proposal A-2, it is possible to flexibly select an unused resource, and compared to the method of Proposal A-1, it is possible to reduce the likelihood of contention over a resource.

According to the method of Proposal B-2, it is possible to reserve a resource more distant in time from a resource used for the transmission of a transport block. Accordingly, in a case where there is a likelihood of contention with the other terminals 20, it is possible to increase the possibility that the terminal 20 successfully reserves the resource.

According to the method of Proposal C, it is possible to avoid reserving a resource that is unlikely to be used. Accordingly, it is possible to enhance the utilization efficiency of resources.

(Device Configuration)

Next, a functional configuration example of the base station 10 and the terminal 20 that perform the processing operations described above is described.

<Base Station 10>

Figure 14:
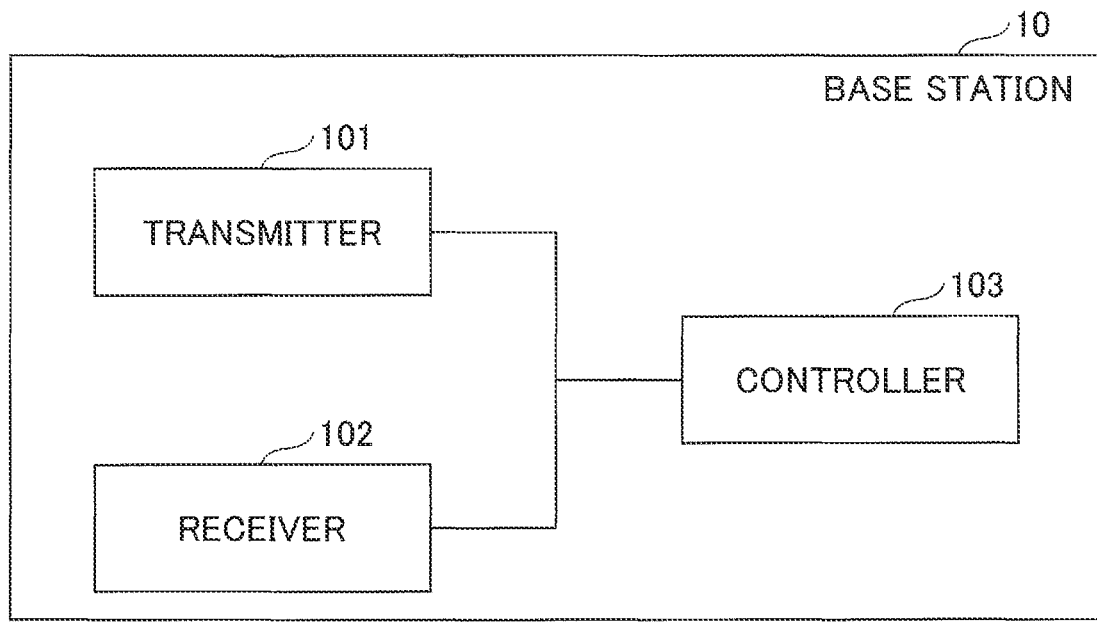
FIG. 14 is a diagram illustrating an example of a functional configuration of a base station according to an embodiment.

FIG. 14 is a diagram illustrating an example of a functional configuration of the base station 10. As illustrated in FIG. 14, the base station 10 includes a transmitter 101, a receiver 102, and a controller 103. The functional configuration illustrated in FIG. 14 is merely one example. The functional division and names of functional units may be any division and names, provided that the operation according to the embodiments of the present invention can be performed. Note that the transmitter 101 may be referred to as a transmitting device, and the receiver 102 may be referred to as a receiving device.

The transmitter 101 includes a function for generating a signal to be transmitted to the terminal and wirelessly transmitting the signal. The receiver 102 includes a function for receiving various types of signals wirelessly transmitted from the terminal 20 and obtaining a higher layer signal from the received signal. Furthermore, the receiver 102 includes a function for measuring a received signal to obtain a quality value.

The controller 103 controls the base station 10. Note that a function of the controller 103 related to transmission may be included in the transmitter 101 and a function of the controller 103 related to reception may be included in the receiver 102.

For example, the controller of the base station 10 may configure the time interval u from the initial transmission of a transport block performed by the terminal 20 until the terminal 20 performs the first retransmission of the transport block, and the transmitter 101 may transmit an RRC signal including the configuration information on the time interval u, to the terminal 20.

Furthermore, for example, the controller 103 of the base station 10 may set the value of m with respect to a PSCCH for the (r−m)th retransmission specifying a resource for the (r)th retransmission by the terminal 20, and the transmitter 101 may transmit an RRC signal including the configuration information on the value of m, to the terminal 20.

<Terminal 20>

Figure 15:
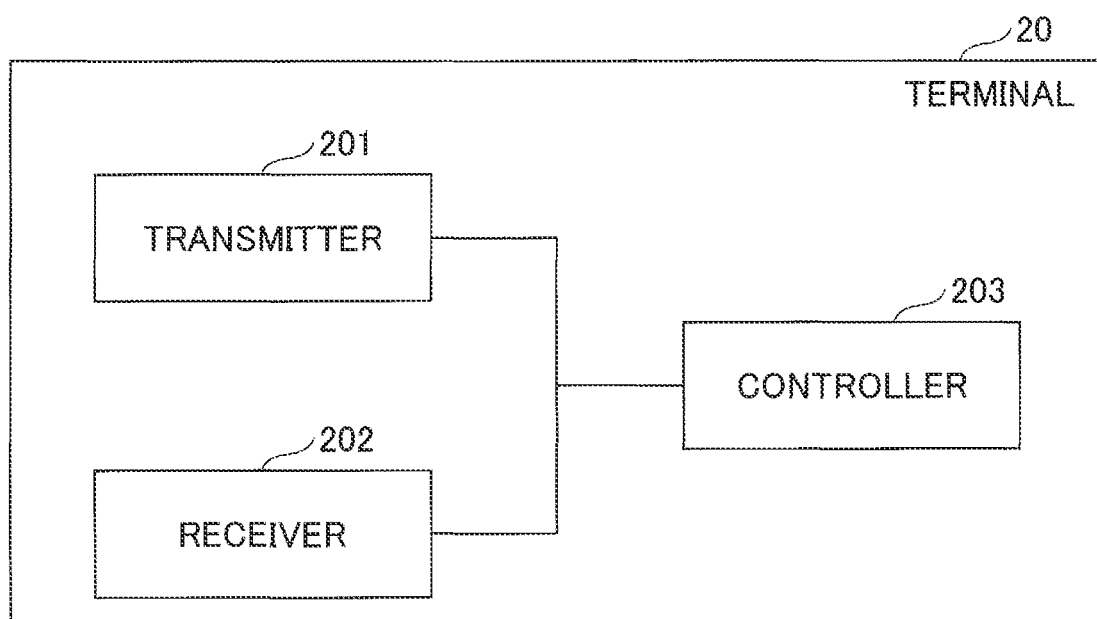
FIG. 15 is a diagram illustrating an example of a functional configuration of a terminal according to an embodiment.

FIG. 15 is a diagram illustrating an example of a functional configuration of the terminal 20. As illustrated in FIG. 15, the terminal 20 includes a transmitter 201, a receiver 202, and a controller 203. The functional configuration illustrated in FIG. 15 is merely an example. The functional division and names of functional units may be any division and names, provided that the operation according to the embodiments can be performed. Note that the transmitter 201 may be referred to as a transmitting device, and the receiver 202 may be referred to as a receiving device. Furthermore, the terminal 20 may be the transmitting terminal 20A or the receiving terminal 20B. Furthermore, the terminal 20 may be the scheduling terminal 20.

The transmission unit 201 generates a transmitting signal from transmitting data and transmits the transmitting signal through radio. The receiver 202 receives various types of signals and obtains a higher layer signal from the received physical layer signal. The receiver 220 includes a function for measuring a received signal and obtaining a quality value.

The controller 203 controls of the terminal 20. Note that the function of the controller 203 related to transmission may be included in the transmitter 201, and the function of the controller 203 related to reception may be included in the receiver 202.

For example, in the case where the receiver 202 of the terminal 20 receives a packet at a timing t1, the receiver 202 of the terminal 20 may receive, at a timing t2-k, a reservation signal (reservation signaling) for the transmitter 201 of the terminal 20 to reserve a resource for the transmitter 201 of the terminal 20 to transmit a packet, and the controller 203 of the terminal 20 may reserve a resource for the transmitter 201 of the terminal 20 to transmit the packet at the timing position t2 in the time domain.

For example, in response to receiving the reservation signal by the receiver 202 of the terminal 20 at a timing t2-k, the controller 203 of the terminal 20 may configure a resource at a timing t2 in the time domain as the resource for the initial transmission of the transport block, and reserve resources at timings t2+r×u in the time domain as the resources for retransmissions of the transport block, where $r \in \{1, 2 \ldots \}$, and u is the time interval between the initial transmission of the transport block and the first retransmission of the transport block. Note that to reserve a resource for a retransmission may be an operation of the transmitter 201 of the terminal 20 to transmit a signal indicating that the terminal 20 is to occupy the resource for a retransmission, to the other terminals 20 and/or the base station 10.

For example, the controller 203 of the terminal 20 may reserve a resource for the initial transmission of the transport block and one or more resources for one or more retransmissions of the transport block at the same time.

For example, the receiver 202 of the terminal 20 may receive a reservation signal transmitted via a PSCCH for the (r−1)th retransmission of the transport block, and the controller 203 of the terminal 20 may reserve a resource for the (r)th retransmission of the transport block based on the reservation signal received by the receiver 202.

For example, the receiver 202 of the terminal 20 may receive a reservation signal transmitted via a PSCCH for the (r−m)th retransmission of the transport block, and the controller 203 of the terminal 20 may reserve a resource for the (r)th retransmission of the transport block based on the reservation signal received by the receiver 202.

For example, the receiver 202 of the terminal 20 may receive a reservation signal via a PSCCH, and the controller 203 of the terminal 20 may configure a resource for the initial transmission of the transport block at a subsequent timing, and at a timing later than the first timing, the controller 203 of the terminal 20 may pre-reserve one or more resources for one or more retransmissions of the transport block. Thereafter, in response to reception of NACK by the receiver 202 of the terminal 20 via a PSFCH, the controller 203 of the terminal 20 may activate the pre-reserved resources for retransmissions of the transport block associated with the PSFCH.

<Hardware Configuration>

The block diagrams (FIG. 14 to FIG. 15) used for the description of the above embodiments illustrate blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire or radio) and using these multiple devices. The functional block may be implemented by combining software with the above-described one device or the above-described plurality of devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and the like. For example, a functional block (component) that functions to transmit is called a transmitting unit or a transmitter. In either case, as described above, the implementation method is not particularly limited.

Figure 16:
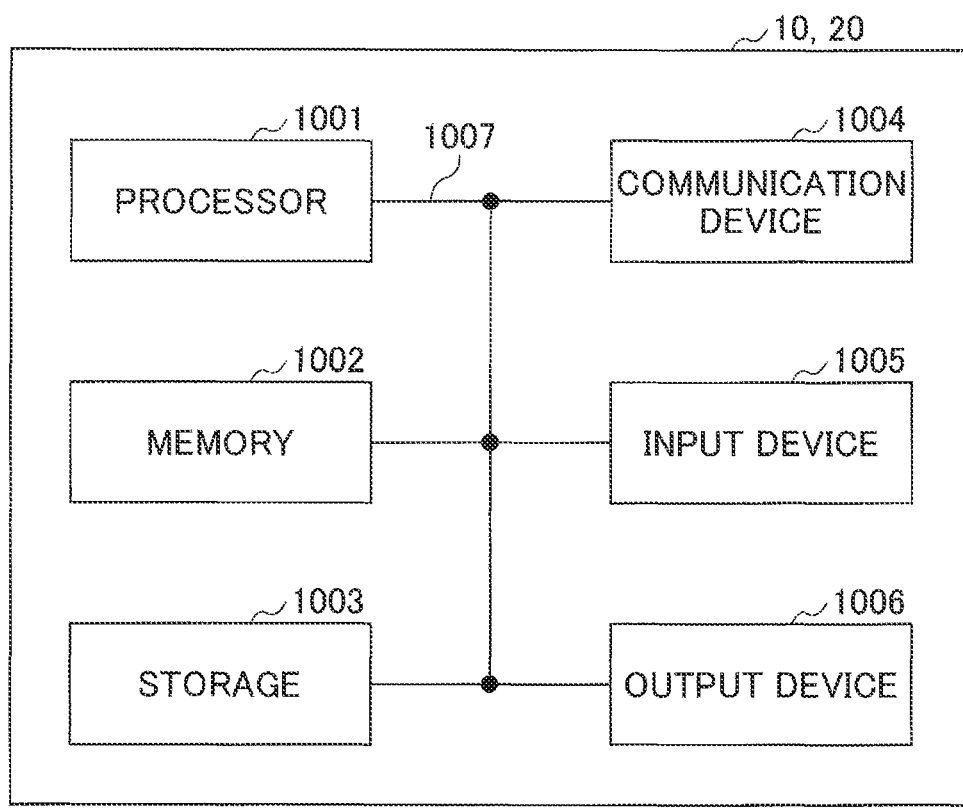
FIG. 16 is a diagram illustrating an example of a hardware configuration of the base station and the terminal according to an embodiment.

For example, the terminal 20 and the base station 10 according to the embodiments of the present invention may function as computers performing the process of the radio communication according to the embodiments of the present invention. FIG. 16 is a diagram illustrating an example of a hardware configuration of the terminal 20 and the base station 10 according to the embodiment. Each of the above-described terminal 20 and the base station 10 may be physically configured as a computer device including a processor 1001, a memory 1002, a storage device 1003, a communication device 1004, an input device 1005, an output device 1006, a bus 1007, or the like.

Note that, in the following description, the term "device" can be replaced with a circuit, a device, a unit, or the like. The hardware configuration of the terminal 20 and the base station 10 may be configured to include one or more of the devices depicted in the figures, which are indicated by 1001 through 1006, or may be configured without some devices.

Each function of the terminal 20 and the base station 10 is implemented by loading predetermined software (program) on hardware, such as the processor 1001 and the memory 1002, so that the processor 1001 performs computation and controls communication by the communication device 1004, and at least one of reading and writing of data in the memory 1002 and the storage device 1003.

The processor 1001, for example, operates an operating system to control the entire computer. The processor 1001 may be configured with a central processing unit (CPU: Central Processing Unit) including an interface with a peripheral device, a control device, a processing device, a register, or the like.

Additionally, the processor 1001 reads a program (program code), a software module, data, or the like from at least one of the storage 1003 and the communication device 1004 to the memory 1002, and executes various processes according to these. As the program, a program is used which causes a computer to execute at least a part of the operations described in the above-described embodiment. For example, the controller 203 of the terminal 20 may be implemented by a control program that is stored in the memory 1002 and that is operated by the processor 1001. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory (ROM), an Erasable Programmable ROM (EPROM), an Electrically Erasable Programmable ROM (EEPROM), and a Random Access Memory (RAM). The memory 1002 may be referred to as a register, a cache, a main memory (main storage device), or the like. The memory 1002 may store a program (program code), a software module, or th like, which can be executed for implementing the radio communication method according to the embodiments of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk), a smart card, a flash memory (e.g., a card, a stick, a key drive), a floppy (registered trademark) disk, or a magnetic strip. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, or the like to implement at least one of frequency division duplex (FDD: Frequency Division Duplex) and time division duplex (TDD: Time Division Duplex).

The input device 1005 is an input device (e.g., a keyboard, mouse, microphone, switch, button, or sensor) that receives an external input. The output device 1006 is an output device (e.g., a display, speaker, or LED lamp) that implements an external output. The input device 1005 and the output device 1006 may have an integrated configuration (for example, a touch panel).

Each device, such as the processor 1001 and the memory 1002, is also connected by the bus 1007 for communicating information. The bus 1007 may be formed of a single bus or may be formed of different buses between devices.

The terminal 20 and the base station 10 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of the functional blocks. For example, processor 1001 may be implemented using at least one of these hardware components.

Conclusion of the Embodiments

In this specification, at least the following terminal and communication method are disclosed.

A terminal including a transmitter that transmits a second signal specifying a resource for an initial transmission of a first signal on a sidelink; and a controller that selects, reserves, or pre-reserves a resource for the initial transmission of the first signal on the sidelink and at least one of one or more resources for one or more retransmissions of the first signal on the sidelink.

According to the above configuration, in the case of performing blind retransmission of the transport block (TB) or retransmission of the transport block based on Hybrid Automatic Repeat Request-Acknowledgement (HARQ-ACK), the resource to be used for the retransmission is clarified.

The controller may reserve the one or more resources by causing the transmitter to transmit a signal indicating that the terminal is to occupy the one or more resources.

According to the above configuration, the procedure of reserving the resource to be used for retransmission is clarified.

The controller may configure the resource for the initial transmission of the first signal on the sidelink, and at the same time, reserves the one or more resources for the one or more retransmissions of the first signal on the sidelink, and, with respect to the resource for the initial transmission of the first signal and the one or more resources for the one or more retransmissions of the first signal, resources in a time domain may have a specific interval, and resources in a frequency domain may have a specific relationship.

According to the above configuration, the overhead of a control signal when reserving a resource used for a retransmission can be reduced.

The controller may reserve a resource for a specific retransmission by a signal transmitted on at least one resource, from among the resource for the initial transmission of the first signal on the sidelink and the one or more resources for the one or more retransmissions of the first signal on the sidelink.

According to the above configuration, a resource for a retransmission of data is limited to a resource indicated by a control signal associated with the initial transmission of the data or a control signal associated with the previous retransmission of the data. Accordingly, the utilization efficiency of resources can be enhanced.

The terminal may further include a receiver that receives feedback information in response to the transmission or the retransmission of the first signal. The controller may pre-reserve the one or more resources for the one or more retransmissions of the first signal on the sidelink, and the controller may configure a specific resource of the one or more resources to be usable, in response to an operation, by the receiver, of receiving a specific signal for the transmission or the retransmission of the first signal on a specific feedback channel.

According to the above configuration, for example, the resource corresponding to the feedback channel that received NACK is configured as a resource for a retransmission of the data. Accordingly, the utilization efficiency of resources can be enhanced.

A communication method executed by a terminal, the method including transmitting a second signal specifying a resource for an initial transmission of a first signal on a sidelink; and selecting, reserving, or pre-reserving a resource for the initial transmission of the first signal on the sidelink and at least one of one or more resources for one or more retransmissions of the first signal on the sidelink.

According to the above configuration, in the case of performing blind retransmission of the transport block (TB) or retransmission of the transport block based on Hybrid Automatic Repeat Request-Acknowledgement (HARQ-ACK), the resource to be used for the retransmission is clarified.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (as long as there is no contradiction) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiments, the order of processing may be changed as long as there is no contradiction. For the convenience of the description of the process, the terminal 20 and the base station 10 are described using functional block diagrams, but such devices may be implemented in hardware, software, or a combination thereof. Software operated by a processor included in the terminal 20 in accordance with the embodiments of the present invention and software operated by a processor included in the base station 10 in accordance with the embodiments of the present invention may be stored in a random access memory (RAM), a flash memory, a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, and the like of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by the base station 10 may be performed by an upper node in some cases. It is apparent that in a network consisting of one or more network nodes having the base station 10, various operations performed for communicating with the terminal may be performed by at least one of the base station 10 and a network node other than the base station 10 (e.g., MME or S-GW can be considered, however, the network node is not limited to these). The case is exemplified above in which there is one network node other than the base station 10. However, the network node other than the base station 10 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched with implementation. Notification of predetermined information (e.g. "X" notice) is not limited to a method that is explicitly performed, and may also be made implicitly (e.g. "no notice of the predetermined information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, or the like.

Software, instructions, information, or the like may also be transmitted and received via a transmission medium. For example, when software is transmitted from a website, server, or other remote source using at least one of wireline technology (such as coaxial cable, fiber optic cable, twisted pair, digital subscriber line) and wireless technology (e.g., infrared or microwave), at least one of these wireline technology and wireless technology is included within the definition of a transmission medium.

The information, signals, or the like described in this disclosure may be represented using any of a variety of different techniques. For example, data, instructions, commands, information, signals, bits, symbols, chips, or the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message.

As used in this disclosure, the terms "system" and "network" are used interchangeably. The information, parameters, or the like described in the present disclosure may also be expressed using absolute values, relative values from predetermined values, or they may be expressed using corresponding separate information. For example, radio resources may be those indicated by an index.

The names used for the parameters described above are not restrictive in any respect. In addition, the mathematical equations using these parameters may differ from those explicitly disclosed in this disclosure. Since the various channels (e.g., PUCCH or PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB(eNB)," "gNodeB (gNB)," "Access Point," "Transmission Point," "Reception Point," "Transmission/Reception Point," "Cell," "Sector," "Cell Group," "Carrier," "Component Carrier," and the like may be used interchangeably. The base stations may be referred to in terms such as macro-cell, small-cell, femto-cell, or pico-cell.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment)", "terminal", or the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, or the like. The mobile body may be a vehicle (e.g., a car or an airplane), an unmanned mobile (e.g., a drone or an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be replaced with the user terminal. For example, various aspects/embodiments of the present disclosure may be applied to a configuration in which communication between the base station and the user terminal is replaced with communication between multiple user terminals (e.g., may be referred to as Device-to-Device (D2D) or Vehicle-to-Everything (V2X)). In this case, a configuration may be such that the above-described function of the base station 10 is included in the user terminal 20. The terms "up" and "down" may also be replaced with the terms corresponding to terminal-to-terminal communication (e.g., "side"). For example, an uplink channel, a downlink channel, or the like may be replaced with a sidelink channel.

Similarly, the user terminal according to the present disclosure may be replaced with a base station. In this case, a configuration may be such that, the function included in the above-described user terminal 20 may be included in the base station 10.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standard applied.

As used in this disclosure, the expression "based on" does not mean "based on only" unless otherwise specified. In other words, the expression "based on" means both "based on only" and "at least based on."

As long as "include," "including," and variations thereof are used in this disclosure, the terms are intended to be inclusive in a manner similar to the term "comprising." Furthermore, the term "or" used in the disclosure is intended not to be an exclusive OR.

In the present disclosure, for example, if an article is added by translation, such as a, an, and the in English, the present disclosure may include that the noun following the article is plural.

In the present disclosure, the term "A and B are different" may imply that "A and B are different from each other." Note that the term may also imply "each of A and B is different from C." The terms, such as "separated" or "coupled," may also be interpreted similarly.

While the present invention is described in detail above, those skilled in the art will appreciate that the present invention is not limited to the embodiments described in this specification. The present invention may be implemented as modifications and variations without departing from the gist and scope of the present invention as defined by the claims. Accordingly, the description of this specification is for illustrative purposes only and is not intended to have any restrictive meaning with respect to the present invention.

LIST OF REFERENCE SYMBOLS 10 base station
20 terminal
101 transmitter
102 receiver
103 controller
201 transmitter
202 receiver
203 controller
1001 processor
1002 memory
1003 storage
1004 communication device
1005 input device
1006 output device

The invention claimed is:

1. A terminal comprising:
a transmitter that transmits a second signal to reserve a resource for transmission of a first signal on a sidelink; and
a controller that simultaneously reserves multiple resources to transmit the first signal on the sidelink,
wherein the multiple resources to transmit the first signal on the sidelink are capable of being configured so that a first time interval between first resources adjacent to each other in a time domain differs from a second time interval between second resources adjacent to each other in the time domain,
wherein a first frequency resource to transmit the first signal on the sidelink for the first time and a second frequency resource to retransmit the first signal on the sidelink for the first time are mutually different in a frequency domain, and the first frequency resource to transmit the first signal on the sidelink for the first time and a third frequency resource to retransmit the first signal on the sidelink for a second time are a same in the frequency domain, and
wherein at least one of the simultaneously reserved multiple resources is for retransmission of the first signal.

2. A communication method executed by a terminal, the method comprising:
transmitting a second signal to reserve a resource for transmission of a first signal on a sidelink; and
simultaneously reserving multiple resources to transmit the first signal on the sidelink,
wherein the multiple resources to transmit the first signal on the sidelink are capable of being configured so that a first time interval between first resources adjacent to each other in a time domain differs from a second time interval between second resources adjacent to each other in the time domain,
wherein a first frequency resource to transmit the first signal on the sidelink for the first time and a second frequency resource to retransmit the first signal on the sidelink for the first time are mutually different in a frequency domain, and the first frequency resource to transmit the first signal on the sidelink for the first time and a third frequency resource to retransmit the first signal on the sidelink for a second time are a same in the frequency domain, and
wherein at least one of the simultaneously reserved multiple resources is for retransmission of the first signal.

* * * * *